United States Patent
Taki et al.

(10) Patent No.: US 9,337,511 B2
(45) Date of Patent: May 10, 2016

(54) NONAQUEOUS SECONDARY BATTERY (71) Applicant: ADEKA CORPORATION, Tokyo (JP)

(72) Inventors: Takayuki Taki, Tokyo (JP); Hiroaki Watanabe, Tokyo (JP); Atsuki Shibuya, Tokyo (JP); Akiko Tasaki, Tokyo (JP); Eiji Katsuno, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/241,654

(22) PCT Filed: Oct. 31, 2012

(86) PCT No.: PCT/JP2012/078135
§ 371 (c)(1),
(2) Date: Feb. 27, 2014

(87) PCT Pub. No.: WO2013/065723
PCT Pub. Date: May 10, 2013

(65) Prior Publication Data
US 2015/0044551 A1    Feb. 12, 2015

(30) Foreign Application Priority Data

Nov. 1, 2011   (JP) ................................ 2011-240049
May 2, 2012   (JP) ................................ 2012-105395

(51) Int. Cl.
*H01M 10/0567* (2010.01)
*H01M 10/052* (2010.01)
(Continued)

(52) U.S. Cl.
CPC ............ *H01M 10/0567* (2013.01); *H01M 4/38* (2013.01); *H01M 10/052* (2013.01); *H01M 4/505* (2013.01); *H01M 2220/20* (2013.01); *H01M 2300/0025* (2013.01); *Y02E 60/122* (2013.01); *Y02T 10/7011* (2013.01)

(58) Field of Classification Search
CPC .............. H01M 2300/0017; H01M 2300/0025
See application file for complete search history.

(56) References Cited

U.S. PATENT DOCUMENTS

| | | |
|---|---|---|
| 5,626,981 A | 5/1997 | Simon et al. |
| 6,872,493 B2 | 3/2005 | Yamada et al. |
| 7,410,731 B2 | 8/2008 | Yoon et al. |

(Continued)

FOREIGN PATENT DOCUMENTS

| | | |
|---|---|---|
| EP | 1202373 | 5/2002 |
| JP | 63-102173 | 5/1988 |

(Continued)

OTHER PUBLICATIONS

International Search Report, PCT/JP2012/078135, Jan. 15, 2013.

*Primary Examiner* — Jane Rhee
(74) *Attorney, Agent, or Firm* — Young & Thompson (57) ABSTRACT

Disclosed is a nonaqueous secondary battery using a positive electrode containing a transition metal and lithium. The battery is prevented from deterioration due to elution of the transition metal from the positive electrode and thereby capable of maintaining small internal resistance and high electrical capacity even after high temperature storage or high-temperature charge and discharge cycles. The battery includes a negative electrode capable of intercalating and deintercalating lithium, a positive electrode containing a transition metal and lithium, and a nonaqueous electrolyte having a lithium salt dissolved in an organic solvent, the nonaqueous electrolyte containing a polycarboxylic ester compound represented by general formula (1) or (2).

4 Claims, 1 Drawing Sheet (51) Int. Cl.
  *H01M 4/38* (2006.01)
  *H01M 4/505* (2010.01)

(56) References Cited

U.S. PATENT DOCUMENTS

| | | |
|---|---|---|
| 2002/0076619 A1 | 6/2002 | Yamada et al. |
| 2004/0043300 A1 | 3/2004 | Utsugi et al. |
| 2006/0172200 A1 | 8/2006 | Yoon et al. |
| 2010/0092863 A1 | 4/2010 | Kim |

FOREIGN PATENT DOCUMENTS

| | | |
|---|---|---|
| JP | 04-087156 | 3/1992 |
| JP | 05-74486 | 3/1993 |
| JP | 10-50342 | 2/1998 |
| JP | 2001-006729 | 1/2001 |
| JP | 2006-216553 | 8/2006 |
| JP | 2007-123097 | 5/2007 |
| JP | 2008-146930 | 6/2008 |
| JP | 2009-032491 | 2/2009 |

NONAQUEOUS SECONDARY BATTERY

TECHNICAL FIELD

This invention relates to a nonaqueous secondary battery, particularly a nonaqueous secondary battery having a nonaqueous electrolyte containing a specific polycarboxylic acid ester compound.

BACKGROUND ART

With the recent spread of portable electronic equipment such as notebook computers, video camcorders, and personal digital assistances, nonaqueous electrolyte secondary batteries having high voltage and high energy density have come to be widely used as a power source. From the concern for the environmental protection, electric-powered vehicles and hybrid-powered vehicles utilizing electric power as a part of motive power have already been put to practical use.

Various additives for nonaqueous electrolyte have been proposed to provide nonaqueous secondary batteries with improved stability or electrical characteristics. Examples of such additives include 1,3-propane sultone (see patent document 1 below), vinyl ethylene carbonate (see patent document 2 below), vinylene carbonate (see patent document 3 below), 1,3-propane sultone or butane sultone (see patent document 4 below), vinylene carbonate (see patent document 5 below), and vinyl ethylene carbonate (see patent document 6 below). Inter alia, vinylene carbonate has been widely used for its high effect. These additives are considered to form a stable film called a solid electrolyte interface covering the surface of a negative electrode, which film is expected to prevent reductive decomposition of an electrolyte.

The recent rise in the price of scarce metals, such as cobalt and nickel, has rapidly boosted use and development of a positive electrode material containing a low-cost metal material, such as manganese or iron. A manganese-containing, lithium transition metal oxide is one of positive electrode materials of current interest for its excellent performance, such as capacity and power, in lithium secondary batteries. It is known, however, that manganese is liable to be eluted from a manganese-containing lithium transition metal oxide as a positive electrode material in a lithium secondary battery to cause a side reaction, resulting in deterioration of battery performance, such as capacity and power.

To prevent elution of manganese from a positive electrode, various additives for a nonaqueous electrolyte have been proposed, including a disulfonic ester as disclosed, e.g., in patent document 7 below. There has still been a demand for further improvements.

CITATION LIST

Patent document 1: JP 63-102173A
Patent document 2: JP 4-87156A
Patent document 3: JP 5-74486A
Patent document 4: JP 10-50342A
Patent document 5: U.S. Pat. No. 5,626,981
Patent document 6: JP 2001-6729A
Patent document 7: US 2004/043300

SUMMARY OF THE INVENTION

Problem to be Solved by the Invention

An object of the invention is to provide a nonaqueous secondary battery having a positive electrode containing a transition metal and lithium, which battery is prevented from deterioration due to the transition metal eluted from the positive electrode and thereby maintains small internal resistance and high electrical capacity even after high temperature storage or high-temperature charge and discharge cycles.

Means for Solving the Problem

As a result of extensive investigations, the present inventors have found that the above object is accomplished by using a nonaqueous electrolyte containing a polycarboxylic ester compound having a specific structure and completed the invention based on this finding.

The invention provides a nonaqueous secondary battery comprising a negative electrode capable of intercalating and deintercalating lithium, a positive electrode containing a transition metal and lithium, and a nonaqueous electrolyte having a lithium salt dissolved in an organic solvent, which is characterized in that the nonaqueous electrolyte contains a polycarboxylic ester compound represented by general formula (1) or (2):

[Chemical Formula 1]

(1)

wherein $R^1$ represents an unsaturated hydrocarbon group having 2 to 6 carbon atoms or an arylene group having 6 to 12 carbon atoms; and $R^2$, $R^3$, $R^4$, $R^5$, $R^6$, and $R^7$ each independently represent an alkyl group having 1 to 6 carbon atoms or an alkenyl group having 2 to 6 carbon atoms;

[Chemical Formula 2]

(2)

wherein $R^8$ represents a saturated hydrocarbon group having 1 to 8 carbon atoms, an unsaturated hydrocarbon group having 2 to 8 carbon atoms, or an arylene group having 6 to 12 carbon atoms; $R^9$, $R^{10}$, and $R^{11}$ each independently represent an alkyl group having 1 to 6 carbon atoms or an alkenyl group having 2 to 6 carbon atoms; and n represents an integer 3 to 6.

Effect of the Invention

The invention provide a nonaqueous secondary battery having a positive electrode containing a transition metal and lithium, which battery maintains a small internal resistance and a high electrical capacity even after high temperature storage or high-temperature charge and discharge cycles.

BEST MODE FOR CARRYING OUT THE INVENTION

The nonaqueous secondary battery of the invention will be described in detail with reference to its preferred embodiments.

[1] Nonaqueous Electrolyte

The nonaqueous electrolyte having a lithium salt dissolved in an organic solvent that can be used in the invention (hereinafter also referred to as the nonaqueous electrode of the invention) contains a polycarboxylic ester compound represented by general formula (1) or (2). The polycarboxylic ester compound will be described hereunder.

In general formula (1), the C2-C6 unsaturated hydrocarbon group as represented by $R^1$ is not limited as long as it is a divalent hydrocarbon group having an unsaturated double bond. Examples of such a hydrocarbon group include vinylene, propenylene, isopropenylene, butenylene, pentenylene, hexenylene, 1-propenylen-2,3-diyl, ethynylene, propynylene, butynylene, pentynylene, and hexynylene. Examples of the C6-C12 arylene group include 1,2-phenylene, 1,3-phenylene, and 1,4-phenylene.

$R^1$ is preferably vinylene, ethynylene, or 1,4-phenylene, more preferably ethynylene, in terms of less susceptibility to alteration by the action of the positive electrode and provision of a highly durable surface structure.

Examples of the C1-C6 alkyl group as represented by $R^2$, $R^3$, $R^4$, $R^5$, $R^6$, and $R^7$ in general formula (1) include methyl, ethyl, propyl, 2-propynyl, butyl, isobutyl, sec-butyl, tert-butyl, pentyl, isopentyl, cyclopentyl, hexyl, and cyclohexyl.

$R^2$, $R^3$, $R^4$, $R^5$, $R^6$, and $R^7$ are each preferably methyl, ethyl, propyl, butyl, or vinyl, more preferably methyl, in terms of less susceptibility to alteration by the action of the positive electrode and provision of a highly durable surface structure.

Examples of the dicarboxylic ester compound represented by general formula (1) include bis(trimethylsilyl)acetylene dicarboxylate, bis(ethyldimethylsilyl)acetylene dicarboxylate, bis(dimethylpropylsilyl)acetylene dicarboxylate, bis(dimethylbutylsilyl)acetylene dicarboxylate, bis(dimethylvinylsilyl)acetylene dicarboxylate, bis(trimethylsilyl) fumarate, bis(trimethylsilyl) maleate, bis(trimethylsilyl) phthalate, bis(trimethylsilyl) isophthalate, bis(trimethylsilyl) terephthalate, and bis(trimethylsilyl) itaconate.

In general formula (2), the C1-C8 saturated hydrocarbon group as represented by $R^8$ is not particularly limited as long as it has n valence whether it is straight-chain, branched, or cyclic. The C1-C8 saturated hydrocarbon group where n=3 is exemplified by [Chemical Formula 3]. The C1-C8 saturated hydrocarbon group where n=4 is exemplified by [Chemical Formula 4].

[Chemical Formula 3]

[Chemical Formula 4]

The C2-C8 unsaturated hydrocarbon group as represented by $R^8$ in general formula (2) is not particularly limited as long as it contains an unsaturated double bond and has n valence. The C2-C8 unsaturated hydrocarbon group where n=3 is exemplified by [Chemical Formula 5]. The C2-C8 unsaturated hydrocarbon group where n=4 is exemplified by [Chemical Formula 6].

[Chemical Formula 5]

[Chemical Formula 6]

The C6-C12 arylene group as represented by $R^8$ in general formula (2) is not particularly limited as long as it has an aromatic ring and n valence. The C6-C12 arylene group where n=3 is exemplified by [Chemical Formula 7]. The C6-C12 arylene group where n=4 is exemplified by [Chemical Formula 8].

[Chemical Formula 7]

[Chemical Formula 8]

Examples of the groups represented by $R^9$, $R^{10}$, and $R^{11}$ in general formula (2) include those listed for $R^2$ to $R^7$ in general formula (1). The n $R^9$'s, n $R^{10}$'s, and n $R^{11}$'s in general formula (2) may be the same or different. While the effects of the invention are obtained as long as n is an integer of 3 to 6, n is preferably 3 or 4. General formula (2) in which n is 2 is equal to general formula (1). With a compound of general formula (2) in which n is 1, cycle characteristics will be reduced. A compound of general formula (2) in which n is greater than 6 has an elevated boiling point and is difficult to purify.

Examples of the tri- or higher carboxylic ester compound represented by general formula (2) include tris(trimethylsilyl) trans-aconitate, tris(triethylsilyl) trans-aconitate, tris(trimethylsilyl) cis-aconitate, trimethylsilyl meso-butane-1,2,3,4-tetracarboxylate, and triethylsilyl meso-butane-1,2,3,4-tetracarboxylate.

The polycarboxylic ester compounds represented by general formulae (1) and (2) may be used either individually or in combination.

When the content of the compound represented by general formulae (1) or (2) in the nonaqueous electrolyte of the invention is too small, sufficient effects may not be produced. If, to the contrary, the content is too large, not only may effects reflecting the increased content not be obtained but the battery performance may be adversely affected. Accordingly, the content of the compound represented by general formulae (1) or (2) is preferably 0.001 to 5 mass %, more preferably 0.01 to 3 mass %, even more preferably 0.03 to 1.5 mass %, relative to the nonaqueous electrolyte.

It is preferred that the nonaqueous electrolyte of the invention further contain a fluorosilane compound having two or more difluorosilyl groups per molecule, a cyclic carbonate compound having an unsaturated group, an acyclic carbonate compound, an unsaturated diester compound, a cyclic sulfuric ester, a cyclic sulfurous ester, a sultone, an aromatic silane compound, an unsaturated phosphoric ester compound, or a halogenated cyclic carbonate compound.

Examples of the fluorosilane compound having two or more difluorosilyl groups per molecule include bis(difluoromethylsilyl)methane, 1,2-bis(difluoromethylsilyl)ethane, 1,3-bis(difluoromethylsilyl)propane, 1,4-bis(difluoromethylsilyl)butane, 1,4-bis(difluoromethylsilyl)benzene, tris(difluoromethylsilyl)methane, and tetrakis(difluoromethylsilyl)methane. Preferred of them are 1,2-bis(difluoromethylsilyl)ethane, 1,3-bis(difluoromethylsilyl)propane, 1,4-bis(difluoromethylsilyl)butane, and tris(difluoromethylsilyl)methane. Examples of the cyclic carbonate compound having an unsaturated group include vinylene carbonate, vinyl ethylene carbonate, propylidene carbonate, ethylene ethylidene carbonate, and ethylene isopropylidene carbonate. Preferred of them are vinylene carbonate and vinyl ethylene carbonate. Examples of the acyclic carbonate compound include dipropargyl carbonate, propargyl methyl carbonate, ethyl propargyl carbonate, bis(1-methylpropargyl) carbonate, and bis(1-dimethylpropargyl) carbonate. Examples of the unsaturated diester compound include dimethyl maleate, diethyl maleate, dipropyl maleate, dibutyl maleate, dipentyl maleate, dihexyl maleate, diheptyl maleate, dioctyl maleate, dimethyl fumarate, diethyl fumarate, dipropyl fumarate, dibutyl fumarate, dipentyl fumarate, dihexyl fumarate, diheptyl fumarate, dioctyl fumarate, dimethyl acetylenedicarbonate, diethyl acetylenedicarbonate, dipropyl acetylenedicarbonate, dibutyl acetylenedicarbonate, dipentyl acetylenedicarbonate, dihexyl acetylenedicarbonate, diheptyl acetylenedicarbonate, and dioctyl acetylenedicarbonate. Examples of the cyclic sulfuric ester include 1,3,2-dioxathiolane-2,2-dioxide, 1,3-propanediol cyclic sulfate, and propane 1,2-cyclic sulfate. Examples of the cyclic sulfurous ester include ethylene sulfite and propylene sulfite. Examples of the sultone include propane sultone, butane sultone, and 1,5,2,4-dioxadithiolane-2,2,4,4-tetroxide. Examples of the aromatic silane compound include trimethylphenylsilane, dimethyldiphenylsilane, ethoxy(methyl)diphenylsilane, monomethyltriphenylsilane, and 1,1,2,2-tetramethyl-1,2-diphenyldisilane. Examples of the unsaturated phosphoric ester compound include tris(2-propynyl)phosphate and diphenyl 2-methacryloyloxyethyl phosphate. Examples of the halogenated cyclic carbonate compound include chloroethylene carbonate, dichloroethylene carbonate, fluoroethylenecarbonate, and difluoroethylene carbonate.

Preferred of these additives are 1,2-bis(difluoromethylsilyl)ethane, 1,4-bis(difluoromethylsilyl)butane, tris(difluoromethylsilyl)methane, vinylene carbonate, vinyl ethylene carbonate, dipropargyl carbonate, dimethyl acetylenedicarboxylate, diethyl acetylenedicarboxylate, propane sultone, butane sultone, phenyltrimethylsilane, tris(2-propynyl)phosphate, chloro ethylene carbonate, dichloroethylene carbonate, and fluoroethylene carbonate. More preferred are 1,2-bis(difluoromethylsilyl)ethane, 1,4-bis(difluoromethylsilyl)butane, tris(difluoromethylsilyl)methane, vinylene carbonate, dipropargyl carbonate, dimethyl acetylenedicarboxylate, propane sultone, and fluoroethylene carbonate. Even more preferred are 1,2-bis(difluoromethylsilyl)ethane, 1,4-bis(difluoromethylsilyl)butane, tris(difluoromethylsilyl)methane, vinylene carbonate, and fluoroethylene carbonate.

These additive compounds may be used either individually or in combination. If the content of the compound described in the nonaqueous electrolyte of the invention is too small, the compound may fail to produce sufficient effects. If, to the contrary, the content is too large, not only may effects reflecting the increased content not be obtained but the battery performance may be adversely affected. Accordingly, the total content of these compounds is preferably 0.005 to 10 mass %, more preferably 0.02 to 5 mass %, even more preferably 0.05 to 3 mass %, relative to the nonaqueous electrolyte.

The organic solvent that can be used in the nonaqueous electrolyte according to the invention may be one of or a combination of two or more of organic solvents commonly used in nonaqueous electrolytes. Examples of useful organic solvents include saturated cyclic carbonate compounds, saturated cyclic ester compounds, sulfoxide compounds, sulfone compounds, amide compounds, saturated acyclic carbonate compounds, acyclic ether compounds, cyclic ether compounds, and saturated acyclic ester compounds.

Inter alia, saturated cyclic carbonate compounds, saturated cyclic ester compounds, sulfoxide compounds, sulfone compounds, and amide compounds have a high relative permittivity and therefore play a role to increase the dielectric constant of the nonaqueous electrolyte. Saturated cyclic carbonate compounds are particularly preferred. Examples of the saturated cyclic carbonate compounds include ethylene carbonate, 1,2-propylene carbonate, 1,3-propylene carbonate, 1,2-butylene carbonate, 1,3-butylene carbonate, and 1,1-dimethylethylene carbonate. Examples of the saturated cyclic ester compounds include γ-butyrolactone, γ-valerolactone, γ-caprolactone, δ-hexanolactone, and δ-octanolactone. Examples of the sulfoxide compounds include dimethyl sulfoxide, diethyl sulfoxide, dipropyl sulfoxide, diphenyl sulfoxide, and thiophene. Examples of the sulfone compounds include dimethyl sulfone, diethyl sulfone, dipropyl sulfone, diphenyl sulfone, sulfolane (also tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, with sulfolane and tetramethyl sulfolane being preferred. Examples of the amide compounds are N-methylpyrrolidone, dimethylformamide, and dimethylacetamide.

Of the above described organic solvents saturated acyclic carbonate compounds, acyclic ether compounds, cyclic ether compounds, and saturated acyclic ester compounds decrease the viscosity of the nonaqueous electrolyte and increase mobility of electrolyte ions thereby to improve battery characteristics, such as power density. To have a low viscosity brings about improvement on the low temperature performance of the nonaqueous electrolyte. Inter alia, saturated acyclic carbonate compounds are preferred. Examples of suitable saturated acyclic carbonate compounds include dimethyl carbonate, ethylmethyl carbonate, diethyl carbonate, ethylbutyl carbonate, methyl-t-butyl carbonate, diisopropyl carbonate, and t-butylpropyl carbonate. Examples of the acyclic or cyclic ether compounds include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, and diethylene glycol bis(trifluoroethyl) ether, with dioxolane being preferred.

The saturated acyclic ester compounds are preferably mono- or diester compounds having a total of 2 to 8 carbon atoms per molecule, such as methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Preferred of them are methyl formate, ethyl formate, methyl acetate, ethyl acetate, propyl acetate, isobutyl acetate, butyl acetate, methyl propionate, and ethyl propionate.

In addition to this, acetonitrile, propionitrile, nitromethane, and their derivatives are also usable, as an organic solvent.

Conventionally known lithium salts can be used in the nonaqueous electrolyte of the invention. Examples include $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, $LiSCN$, $LiClO_4$, $LiCl$, $LiF$, $LiBr$, $LiI$, $LiAlF_4$, $LiAlCl_4$, and their derivatives. It is preferred to use at least one of $LiPF_6$, $LiBF_4$, $LiClO_4$, $LiAsF_6$, $LiCF_3SO_3$, $LiC(CF_3SO_2)_3$, $LiCF_3SO_3$ derivatives, and $LiC(CF_3SO_2)_3$ derivatives in terms of good electrical characteristics.

The lithium salt is preferably dissolved in the organic solvent in a concentration of 0.1 to 3.0 mol/l, still preferably 0.5 to 2.0 mol/l. At lithium salt concentrations lower than 0.1 mol/l, the resulting battery may fail to provide a sufficient current density. Lithium salt concentrations higher than 3.0 mol/l can impair the stability of the nonaqueous electrolyte. The lithium salts described may be used in combination of two or more thereof.

A flame retardant of halogen, phosphorus or other types may be added to the nonaqueous electrolyte of the invention as appropriate to provide a flame retardant electrolyte. Addition of too small an amount of a flame retardant fails to produce sufficient effects. If, to the contrary, the amount of a flame retardant is too large, not only may effects reflecting the increased content not be obtained but the battery performance may be adversely affected. Accordingly, the amount of a flame retardant to be added is preferably 1% to 50%, more preferably 3% to 10%, by mass relative to the organic solvent of the nonaqueous electrode.

The nonaqueous electrolyte of the invention is useful in both primary batteries and secondary batteries. The above discussed effects of the nonaqueous electrolyte of the invention are pronouncedly exhibited when it is used in nonaqueous secondary batteries as is claimed in the present invention, particularly a lithium ion secondary battery.

[2] Negative Electrode

Any negative electrode capable of intercalating and deintercalating lithium can be used in the invention. A preferred negative electrode is as follows. The negative electrode of the nonaqueous secondary battery according to the invention is made by dispersing a negative electrode active material and a binder in an organic solvent or water and applying the resulting slurry to a current collector, followed by drying into a sheet form. If desired, an electroconductive material is incorporated therein.

Examples of the negative electrode active material include, but are not limited to, natural graphite, synthetic graphite, non-graphitizing carbon, graphitizing carbon, lithium, lithium alloys, tin alloys, silicon alloys, silicon oxide, and titanium oxide.

Examples of the binder used in the negative electrode include, but are not limited to, polyvinylidene fluoride, polytetrafluoroethylene, EPDM, SBR, NBR, fluororubber, and polyacrylic acid. The binder is preferably used in an amount of 0.001 to 5 parts by mass, more preferably 0.05 to 3 parts by mass, even more preferably 0.01 to 2 parts by mass, per 100 parts by mass of the negative electrode active material.

Examples of the solvent for preparing the slurry include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, polyethylene oxide, and tetrahydrofuran. The solvent is preferably used in an amount of 30 to 300 parts by mass, more preferably 50 to 200 parts by mass, per 100 parts by mass of the negative electrode active material.

The current collector of the negative electrode is usually made of copper, nickel, stainless steel, or nickel-plated copper.

Examples of the electroconductive material that may be used where needed include, but are not limited to, fine particles of graphite and fine particles of amorphous carbon such as carbon black (e.g., acetylene black or ketjen black) and needle coke, and carbon nanofiber.

[3] Positive Electrode

The positive electrode containing a transition metal and lithium that can be used in the invention is prepared in the same manner as for the negative electrode. That is, a slurry of a positive electrode active material, a binder, an electroconductive material, etc. in an organic solvent or water is applied to a current collector and dried into a sheet form. The positive electrode active material contains a transition metal and lithium. Preferred is a substance containing one transition metal and lithium, such as a lithium-transition metal complex oxide or a lithium-containing transition metal phosphate compound. A mixture of such substances may be used. The transition metal of the lithium-transition metal complex oxide is preferably vanadium, titanium, chromium, manganese, iron, cobalt, nickel, or copper. Examples of the lithium-transition metal complex oxide include a lithium-cobalt complex oxide (e.g., $LiCoO_2$), a lithium-nickel complex oxide (e.g., $LiNiO_2$), a lithium-manganese complex oxide (e.g., $LiMnO_2$, $LiMn_2O_4$, or $Li_2MnO_3$), each of which may have part of its transition metal atom substituted with other metal element, e.g., aluminum, titanium, vanadium, chromium, manganese, iron, cobalt, lithium, nickel, copper, zinc, magnesium, gallium, or zirconium. Examples of such substituted complex oxides include $LiNi_{0.5}Mn_{0.5}O_2$, $LiNi_{0.80}Co_{0.17}Al_{0.03}O_2$, $LiNi_{1/3}Co_{1/3}Mn_{1/3}O_2$, $LiMn_{1.8}Al_{0.2}O_4$, and $LiMn_{1.5}Ni_{0.5}O_4$. The transition metal of the lithium-containing transition metal phosphate compound is preferably vanadium, titanium, manganese, iron, cobalt, or nickel. Examples of the lithium-containing transition metal phosphate compound include iron phosphates (e.g., $LiFePO_4$) and cobalt phosphates (e.g., $LiCoPO_4$), each of which may have part of its transition metal substituted with other metal element, e.g., aluminum, titanium, vanadium, chromium, manganese, iron, cobalt, lithium, nickel, copper, zinc, magnesium, gallium, zirconium, or niobium.

The lithium-containing metal oxide containing magnesium is preferred for use as a positive electrode active material in the nonaqueous secondary battery of the invention; for the effect of adding the polycarboxylic ester compound (1) or (2) to the nonaqueous electrolyte is easily exhibited. In particular, $Li_{1.1}Mn_{1.5}Mg_{0.1}O_4$, $Li_{1.1}Mn_{1.85}Al_{0.05}O_4$, $LiNi_{1/3}Co_{1/3}Mn_{1/5}O_2$, and $LiNi_{0.5}Co_{0.2}Mn_{0.3}O_2$ are preferred for their excellent performance as a positive electrode active material.

The binder and the solvent used to prepare the slurry for making the positive electrode are the same as those useful to make the negative electrode. The binder is preferably used in an amount of 0.001 to 20 parts by mass, more preferably 0.01 to 10 parts by mass, even more preferably 0.02 to 8 parts by mass, per 100 parts by mass of the positive electrode active material. The solvent is used in an amount of 30 to 300 parts by mass, more preferably 50 to 200 parts by mass, per 100 parts by mass of the positive electrode active material.

Examples of the electroconductive material that may be used in the positive electrode include, but are not limited to, fine particles of graphite and fine particles of amorphous carbon such as carbon black (e.g., acetylene black or ketjen black) and needle coke, and carbon nanofiber. The amount of the electroconductive material to be used is preferably 0.01 to 20 parts by mass, more preferably 0.1 to 10 parts by mass, per 100 parts by mass of the positive electrode active material.

The current collector of the positive electrode is usually made of aluminum, stainless steel, or nickel-plated steel.

It is preferable to interpose a separator between the positive and the negative electrode in the nonaqueous electrolyte secondary battery according to the invention. A commonly employed microporous polymer film can be used as a separator with no particular restriction. Polymer materials providing a microporous film separator include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers such as polyethylene oxide and polypropylene oxide, celluloses such as carboxymethyl cellulose and hydroxypropyl cellulose, poly(meth)acrylic acid and esters thereof; derivatives of these polymers; copolymers of monomers of the recited polymers; and polyblends of these polymer materials. The separator may be a single film or a composite film composed of two or more films. Various additives may be added to the separator film with no particular limitation on the kind and amount. A film made of polyethylene, polypropylene, polyvinylidene fluoride, or polysulfone is particularly preferred for use in the nonaqueous secondary battery of the invention.

The separator film is microporous for allowing the electrolyte ions to penetrate therethrough. Such a microporous film is prepared by (1) a phase separation method comprising inducing microphase separation in a solution of a polymer in a solvent in film form and removing the solvent by extraction and (2) a stretching method comprising extruding a molten polymer at a high draft ratio, heat treating the extruded film to unidirectionally align the crystals, and stretching the film to form voids between crystals. The method of microporous film formation is chosen according to the film material.

In order to ensure safety of the nonaqueous secondary battery of the invention, a phenol antioxidant, a phosphorus antioxidant, a thioether antioxidant, a hindered amine compound, or a like stabilizer may be added to the positive electrode materials, the nonaqueous electrolyte, or the separator.

Figure 1:
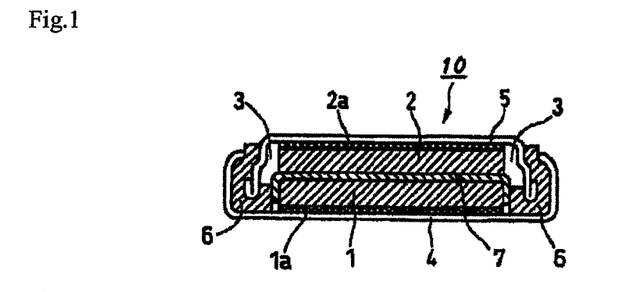
FIG. 1 is a schematic cross-sectional view of an exemplary coin-shaped nonaqueous secondary battery according to the present invention.

The nonaqueous secondary battery of the invention is not particularly limited in shape and may be coin-shaped, cylindrical, or rectangular. FIG. 1 illustrates an example of a coin-shaped nonaqueous secondary battery of the invention, and FIGS. 2 and 3 each illustrate an example of a cylindrical nonaqueous secondary battery of the invention.

The coin battery 10 illustrated in FIG. 1 has a positive electrode 1 capable of deintercalating lithium ions, a positive electrode current collector 1a, a negative electrode 2 made of a carbonaceous material capable of intercalating/deintercalating lithium ions released from the positive electrode, a negative electrode current collector 2a, a nonaqueous electrolyte 3 according to the invention, a positive electrode case 4 made of stainless steel, a negative electrode case 5 made of stainless steel, a polypropylene gasket 6, and a polyethylene separator 7.

Figure 2:
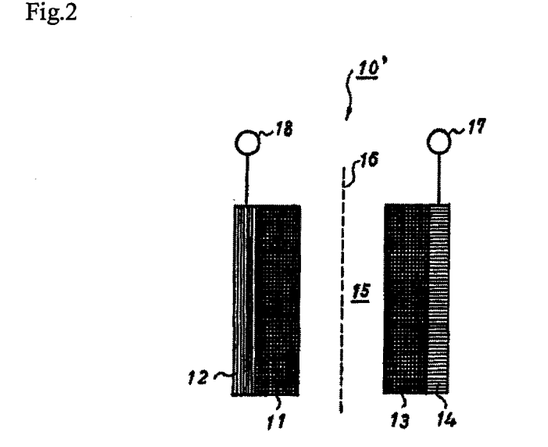
FIG. 2 schematically illustrates the basic structure of a cylindrical nonaqueous secondary battery according to the invention.
Figure 3:
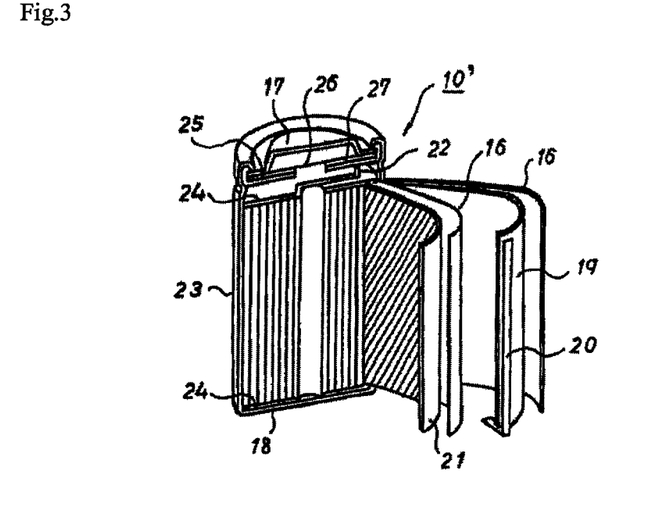
FIG. 3 is a perspective view, with parts exploded and parts in cross-section, illustrating a cylindrical nonaqueous secondary battery of the invention.

As illustrated in FIGS. 2 and 3, the cylindrical battery 10' includes a negative electrode 11, a negative electrode current collector 12, a positive electrode 13, a positive electrode current collector 14, a nonaqueous electrolyte 15 of the present invention, a separator 16, a positive electrode terminal 17, a negative electrode terminal 18, a negative electrode plate 19, a negative electrode lead 20, a positive electrode plate 21, a positive electrode lead 22, a case 23, an insulating plate 24, a gasket 25, a safety valve 26, and a PTC element 27.

EXAMPLE

The invention will now be illustrated in greater detail with reference to Examples, but it should be understood that the invention is not construed as being limited thereto. Unless otherwise noted, all the parts and percents are by mass.

Preparation Examples 1 through 5 show synthesis of the polycarboxylic ester compounds (1). Preparation Examples 6 and 7 demonstrate synthesis of the polycarboxylic ester compounds (2). In what follows, the compounds prepared in Preparation Examples 1 to 7 will be inclusively referred to as the compound of the invention. Examples 1 through 20 and Comparative Examples 1 through 10 show nonaqueous secondary batteries of the invention and their comparative examples.

Preparation Example 1

Synthesis of bis(trimethylsilyl)acetylene dicarboxylate (compound A1)

A 200 ml three-necked flask equipped with a reflux condenser was charged with 11.4 g of acetylenedicarboxylic acid, 20.4 g of bistrimethylsilylurea, 140 ml of methylene chloride, and the mixture was stirred at room temperature. Ten minutes later, the temperature was elevated to 40° C., at which the stirring was continued for 2 hours. The reaction mixture was allowed to cool to room temperature, followed by filtration by suction to remove by-produced urea, followed by distillation under reduced pressure to give 14.7 g of bis(trimethylsilyl)acetylene dicarboxylate.

Preparation Example 2

Synthesis of bis(trimethylsilyl) maleate (compound A2)

A 200 ml three-necked flask equipped with a reflux condenser was charged with 11.6 g of maleic acid, 20.4 g of bistrimethylsilylurea, 140 ml of methylene chloride, followed by stirring at room temperature. Ten minutes later, the temperature was raised to 40° C., at which the stirring was continued for 2 hours. The reaction mixture was allowed to cool to room temperature, followed by filtration by suction to remove by-produced urea, followed by distillation under reduced pressure to give 17.8 g of bis(trimethylsilyl) maleate.

Preparation Example 3

Synthesis of bis(trimethylsilyl) fumarate (compound A3)

A 200 ml three-necked flask equipped with a reflux condenser was charged with 11.6 g of fumaric acid, 20.4 g of bistrimethylsilylurea, 140 ml of methylene chloride, followed by stirring at room temperature. Ten minutes later, the temperature was raised to 40° C., at which the stirring was continued for 2 hours. The reaction mixture was allowed to cool to room temperature, followed by filtration by suction to remove by-produced urea, followed by distillation under reduced pressure to give 17.6 g of bis(trimethylsilyl) fumarate.

Preparation Example 4

Synthesis of bis(trimethylsilyl) phthalate (compound A4)

A 200 ml three-necked flask equipped with a reflux condenser was charged with 16.6 g of phthalic acid, 20.4 g of bistrimethylsilylurea, 200 ml of methylene chloride, followed by stirring at room temperature. Ten minutes later, the temperature was raised to 40° C., at which the stirring was continued for 2 hours. The reaction mixture was allowed to cool to room temperature, followed by filtration by suction to remove by-produced urea, followed by distillation under reduced pressure to give 22.3 g of bis(trimethylsilyl) phthalate.

Preparation Example 5

Synthesis of bis(trimethylsilyl) itaconate (compound A5)

A 200 ml three-necked flask equipped with a reflux condenser was charged with 13.0 g of itaconic acid, 20.4 g of bistrimethylsilylurea, 200 ml of methylene chloride, followed by stirring at room temperature. Ten minutes later, the temperature was raised to 40° C., at which the stirring was continued for 2 hours. The reaction mixture was allowed to cool to room temperature, followed by filtration by suction to remove by-produced urea, followed by distillation under reduced pressure to give 18.4 g of bis(trimethylsilyl) itaconate.

Preparation Example 6

Synthesis of tris(trimethylsilyl) trans-aconitate (compound A6)

A 200 ml three-necked flask equipped with a reflux condenser was charged with 11.6 g of trans-aconitic acid, 20.4 g of bistrimethylsilylurea, 200 ml of methylene chloride, followed by stirring at room temperature. Ten minutes later, the temperature was raised to 40° C., at which the stirring was continued for 2 hours. The reaction mixture was allowed to cool to room temperature, followed by filtration by suction to remove by-produced urea, followed by distillation under reduced pressure to give 17.0 g of tris(trimethylsilyl) trans-aconitate.

Preparation Example 7

Synthesis of trimethylsilyl meso-butane-1,2,3,4-tetracarboxylate (compound A7)

A 200 ml three-necked flask equipped with a reflux condenser was charged with 11.7 g of meso-butane-1,2,3,4-tetracarboxylic acid, 20.4 g of bistrimethylsilylurea, 200 ml of methylene chloride, followed by stirring at room temperature. Ten minutes later, the temperature was raised to 40° C., at which the stirring was continued for 2 hours. The reaction mixture was allowed to cool to room temperature, followed by filtration by suction to remove by-produced urea, followed by distillation under reduced pressure to give 23.5 g of tetrakis(trimethylsilyl) mesao-butane-1,2,3,4-tetracarboxylate.

Examples 1 to 20 and Comparative Examples 1 to 10

Making and Evaluation of Nonaqueous Secondary Batteries

Nonaqueous secondary lithium batteries were made in accordance with the following procedure.]
(1) Making of Positive Electrode A
Seventy-two parts of $LiMn_2O_4$ and 18 parts of $LiNi_{1/3}Co_{1/3}Mn_{1/3}O_2$ as active materials, 5 parts of acetylene black as an electroconductive material, and 5 parts of polyvinylidene fluoride (PVDF) as a binder were mixed, and the mixture was dispersed in 140 parts of N-methyl-2-pyrrolidone (NMP). The resulting slurry was applied to an aluminum current collector, dried, and pressed into a sheet, which was cut to size to provide a disk-shaped positive electrode (designated positive electrode A).
(2) Making of Positive Electrode B
Ninety parts of $LiNi_{1/3}Co_{1/3}Mn_{1/3}O_2$ as an active material, 5 parts of acetylene black as an electroconductive material, and 5 parts of PVDF as a binder were mixed, and the mixture was dispersed in 140 parts of NMP. The resulting slurry was applied to an aluminum current collector, dried, and pressed into a sheet, which was cut to size to provide a disk-shaped positive electrode (designated positive electrode B).
(3) Making of Negative Electrode
Synthetic graphite (96.0 parts) as an active material, 1.0 part of acetylene black, 1.5 parts of styrene-butadiene rubber as a binder, and 1.5 parts of VEMALi (water-soluble lithium salt of a methyl vinyl ether/maleic anhydride copolymer) as a thickener were mixed, and the mixture was dispersed inn 120 parts of water. The resulting slurry was applied to a copper current collector, dried, and pressed into a sheet form, which was cut to size to make a disk-shaped negative electrode.
(4) Preparation of Electrolyte Solution A
$LiPF_6$ was dissolved in a mixed solvent of 30 vol % ethylene carbonate, 40 vol % ethyl methyl carbonate, 25 vol % dimethyl carbonate, and 5 vol % propyl acetate in a concentration of 1 mol/l to prepare an electrolyte solution (designated electrolyte solution A).
(5) Preparation of Electrolyte Solution B
$LiPF_6$ was dissolved in a mixed solvent of 30 vol % ethylene carbonate, 40 vol % ethyl methyl carbonate, and 30 vol % dimethyl carbonate in a concentration of 1 mol/l to prepare an electrolyte solution (designated electrolyte solution B).

(6) Preparation of Nonaqueous Electrolyte

Additive(s) selected from compounds A1 through A7 obtained in Preparation Examples 1 to 7, compounds B1 to B4, and compounds A'1 to A'3 described below was/were dissolved in an electrolyte solution in ratios shown in Table 1 or 2 below to prepare nonaqueous electrolytes of the invention and comparative nonaqueous electrolytes. In Tables 1 and 2 the figures in the parentheses represent the concentrations (mass %) in the nonaqueous electrolyte.

Compound B1: 1,2-bis(difluoromethylsilyl)ethane
Compound B2: vinylene carbonate
Compound B3: phenyltrimethylsilane
Compound B4: tris(2-propynyl)phosphate
Compound A'1: trimethylsilyl acetate
Compound A'2: trimethylsilyl tetrolate
Compound A'3: bis(trimethylsilyl)succinate (7) Assembly of Battery The disk-shaped positive electrode A or B and the disk-shaped negative electrode were put into a case with a 25 μm thick polyethylene microporous film interposed therebetween. The nonaqueous electrolyte or the comparative nonaqueous electrolyte shown in Table 1 was poured into the case, and the case was closed and sealed to make 20 mm diameter, 3.2 mm thick coin-shaped lithium secondary batteries of Examples 1 to 20 and Comparative Examples 1 to 10.

TABLE 1

| | Additive to Electrolyte | Electrolyte Solution | Positive Electrode |
|---|---|---|---|
| Example 1 | A1 (0.2) | B1 (0.3) | A | A |
| Example 2 | A2 (0.2) | B1 (0.3) | A | A |
| Example 3 | A3 (0.2) | B1 (0.3) | A | A |
| Example 4 | A4 (0.2) | B1 (0.3) | A | A |
| Example 5 | A1 (0.4) | B1 (0.3) | A | A |
| Example 6 | A2 (0.4) | B1 (0.3) | A | A |
| Example 7 | A3 (0.4) | B1 (0.3) | A | A |
| Example 8 | A4 (0.4) | B1 (0.3) | A | A |
| Example 9 | A5 (0.4) | B1 (0.3) | A | A |
| Example 10 | A6 (0.4) | B1 (0.3) | A | A |
| Example 11 | A7 (0.4) | B1 (0.3) | A | A |
| Example 12 | A1 (0.5) | B2 (1.0) | A | A |
| Example 13 | A2 (0.5) | B2 (1.0) | A | A |
| Example 14 | A3 (0.5) | B2 (1.0) | A | A |
| Example 15 | A4 (0.5) | B2 (1.0) | A | A |
| Example 16 | A3 (0.5) | B3 (1.0) | A | A |
| Example 17 | A3 (0.5) | B4 (1.0) | A | A |
| Example 18 | A1 (0.2) | B1 (0.3) | B | A |
| Example 19 | A1 (0.1) | B1 (0.3) | A | B |
| Example 20 | A1 (0.3) | B2 (1.0) | A | B |

TABLE 2

| | Additive to Electrolyte | Electrolyte Solution | Positive Electrode |
|---|---|---|---|
| Comp. Example 1 | — | — | A | A |
| Comp. Example 2 | A'1 (0.2) | B1 (0.3) | A | A |
| Comp. Example 3 | A'2 (0.2) | B1 (0.3) | A | A |
| Comp. Example 4 | A'1 (0.5) | B2 (1.0) | A | A |
| Comp. Example 5 | A'2 (0.5) | B2 (1.0) | A | A |
| Comp. Example 6 | A'1 (0.5) | — | A | A |
| Comp. Example 7 | A'2 (0.5) | — | A | A |
| Comp. Example 8 | A'3 (0.5) | — | A | A |
| Comp. Example 8 | A'1 (0.2) | B1 (0.3) | B | A |
| Comp. Example 10 | A'1 (0.1) | B1 (0.3) | A | B |

The lithium secondary batteries of Examples 1 to 20 and Comparative Examples 1 to 10 were tested for initial characteristics and cycle characteristics by the test methods described below. A discharge capacity ratio and an internal resistance ratio were obtained by the initial characteristics testing. A discharge capacity retention and an internal resistance increase ratio were obtained by the cycle characteristics testing. The test results obtained are shown in Tables 3 and 4. A higher discharge capacity ratio and a lower internal resistance ratio indicate higher initial performance of the nonaqueous secondary battery. A higher discharge capacity retention and a lower internal resistance increase ratio indicate higher cycle characteristics of the nonaqueous secondary battery.

(a) Test Method for Initial Characteristics with Positive Electrode A (a-1) Determination of Discharge Capacity Ratio The lithium secondary battery was placed in a thermostat at 20° C. and charged by the CC/CV method at a current of 0.3 mA/cm$^2$, which corresponds to a rate of 0.2 C, to 4.2 V and then discharged at a constant current of 0.3 mA/cm$^2$, which corresponds to a rate of 0.2 C, to 3.0 V for 5 cycles. Thereafter, the battery was charged by the CC/CV method at 0.3 mA/cm$^2$ to 4.2 V and discharged at a constant current of 0.3 mA/cm$^2$ to 3.0 V. The discharge capacity in this 6th discharge was taken as the initial discharge capacity of the battery. A ratio of the initial discharge capacity as measured to that of Example 1, being taken as 100, was calculated as follows to give a discharge capacity ratio (%).

Discharge capacity ratio (%)=[(initial discharge capacity)/(initial discharge capacity of Example 1)]×100

(a-2) Determination of Internal Resistance Ratio

The lithium secondary battery after the measurement of the discharge capacity in the sixth cycle was charged at a constant current of 1.5 mA/cm$^2$ (corresponding to a rate of 1 C) to an SoC of 60%. The impedance was measured over a frequency range of from 100 kHz to 0.02 Hz using an alternating current impedance measurement system (a mobile potentiostat CompactStat from Ivium Technologies) to prepare a Cole-Cole plot with the imaginary part as ordinate and the real part abscissa. The arc of the Cole-Cole plot was fitted with a circle. The greater value of the two intersections between the fitting circle and the real part is taken as the initial internal resistance of the battery. A ratio of the initial internal resistance thus determined to the initial internal resistance of Example 1 (being taken as 100) was calculated as follows to give an initial internal resistance ratio.

Internal resistance ratio (%)=[(initial internal resistance)/(initial internal resistance of Example 1)]×100

(b) Test Method for Initial Characteristics with Positive Electrode B

The lithium secondary battery was placed in a thermostat at 20° C. and charged by the CC/CV method at a current of 0.3 mA/cm$^2$, which corresponds to a rate of 0.2 C, to 4.3 V and then discharged at a constant current of 0.3 mA/cm$^2$, which corresponds to a rate of 0.2 C, to 3.0 V for 5 cycles. Thereafter, the battery was charged by the CC/CV method at 0.3 mA/cm$^2$ to 4.3 V and discharged at a constant current of 0.3 mA/cm$^2$ to 3.0 V. The discharge capacity in this 6th discharge was taken as the initial discharge capacity of the battery. A discharge capacity ratio (%) of the battery was obtained in the same manner as described for the case of positive electrode A. The lithium secondary battery after the measurement of the discharge capacity in the sixth cycle was further tested in the same manner as in the initial characteristics testing for the case of positive electrode A to obtain an internal resistance ratio (%).

(c) Test Method for Cycle Characteristics with Positive Electrode A (c-1) Determination of Discharge Capacity Retention The lithium secondary battery after the initial characteristics test was placed in a thermostat at 60° C. and charged at a constant current of 1.5 mA/cm², which corresponds to a rate of 1 C (a rate of 1 C means that an entire battery capacity will be discharged in one hour) to 4.2 V and then discharged at a constant current of 1.5 mA/cm² to 3.0 V for a total of 150 cycles. The discharge capacity in the 150th cycle was taken as a discharge capacity after cycles. A ratio of the discharge capacity after cycles to the initial discharge capacity (being taken as 100) was calculated as follows to give a discharge capacity retention (%).

Discharge capacity retention (%)=[(discharge capacity after cycles)/(initial discharge capacity)]×100

(c-2) Determination of Internal Resistance Increase Ratio

The battery after the cycle test was returned to an environment of 20° C. to determine the internal resistance at 20° C. in the same manner as described above, which was taken as an internal resistance after cycles. A ratio of the increase in internal resistance after the cycle test to the initial internal resistance (being taken as 100) was calculated as follows to give an internal resistance increase ratio (%).

Internal resistance increase ratio (%)=[(internal resistance after cycles−initial internal resistance)/(initial internal resistance)]×100

(d) Test Method for Cycle Characteristics with Positive Electrode B

The lithium secondary battery after the initial characteristics test was placed in a thermostat at 60° C. and charged at a constant current of 1.5 mA/cm², which corresponds to a rate of 1 C (a rate of 1 C means that an entire battery capacity will be discharged in one hour) to 4.3 V and then discharged at a constant current of 1.5 mA/cm² to 3.0 V for a total of 150 cycles. The discharge capacity in the 150th cycle was taken as a discharge capacity after cycles. A discharge capacity retention (%) was calculated in the same manner as for the case of using positive electrode A. The lithium secondary battery after the cycle test was further tested in the same manner as in the cycle characteristics testing for the case of positive electrode A to obtain an internal resistance increase ratio (%).

TABLE 3

| | Initial Characteristics | | Cycle Characteristics | |
| --- | --- | --- | --- | --- |
| | Discharge Capacity Ratio | Internal Resistance Ratio | Discharge Capacity Retention | Internal Resistance Increase Ratio |
| Example 1 | 100 | 100 | 85 | 17 |
| Example 2 | 100 | 101 | 85 | 17 |
| Example 3 | 100 | 102 | 84 | 18 |
| Example 4 | 101 | 112 | 87 | 22 |
| Example 5 | 100 | 110 | 86 | 19 |
| Example 6 | 100 | 112 | 87 | 16 |
| Example 7 | 101 | 114 | 85 | 20 |
| Example 8 | 100 | 122 | 89 | 25 |
| Example 9 | 100 | 115 | 84 | 27 |
| Example 10 | 100 | 125 | 90 | 22 |
| Example 11 | 101 | 128 | 92 | 21 |
| Example 12 | 99 | 101 | 82 | 19 |
| Example 13 | 100 | 102 | 82 | 18 |
| Example 14 | 100 | 103 | 80 | 20 |
| Example 15 | 99 | 113 | 84 | 24 |
| Example 16 | 100 | 110 | 89 | 20 |
| Example 17 | 100 | 103 | 94 | 24 |
| Example 18 | 101 | 100 | 84 | 22 |
| Example 19 | 100 | 95 | 88 | 15 |

TABLE 3-continued

| | Initial Characteristics | | Cycle Characteristics | |
| --- | --- | --- | --- | --- |
| | Discharge Capacity Ratio | Internal Resistance Ratio | Discharge Capacity Retention | Internal Resistance Increase Ratio |
| Example 20 | 100 | 96 | 86 | 16 |

TABLE 4

| | Initial Characteristics | | Cycle Characteristics | |
| --- | --- | --- | --- | --- |
| | Discharge Capacity Ratio | Internal Resistance Ratio | Discharge Capacity Retention | Internal Resistance Increase Ratio |
| Compara. Example 1 | 100 | 98 | 62 | 45 |
| Compara. Example 2 | 100 | 132 | 84 | 31 |
| Compara. Example 3 | 100 | 168 | 86 | 41 |
| Compara. Example 4 | 99 | 128 | 80 | 41 |
| Compara. Example 5 | 100 | 153 | 82 | 48 |
| Compara. Example 6 | 100 | 101 | 61 | 43 |
| Compara. Example 7 | 100 | 132 | 71 | 38 |
| Compara. Example 8 | 100 | 108 | 71 | 33 |
| Compara. Example 9 | 99 | 131 | 82 | 32 |
| Compara. Example 10 | 100 | 128 | 83 | 47 |

As is apparent from the results in Tables 3 and 4, it was confirmed that the nonaqueous secondary battery of the invention characterized by containing the polycarboxylic ester compound having a silyl group in its nonaqueous electrolyte is excellent in terms of internal resistance and discharge capacity in the cycle test at 60° C. even with the amount of the compound added being small and is able to retain excellent battery characteristics.

The nonaqueous secondary battery of the invention maintains a small internal resistance and a high discharge capacity even in use for a long time and in an environment with widely varying temperatures and is therefore beneficial.

DESCRIPTION OF REFERENCE NUMERALS

1: positive electrode
1a: positive electrode current collector
2: negative electrode
2a: negative electrode current collector
3: nonaqueous electrolyte
4: positive electrode case
5: negative electrode case
6: gasket
7: separator
10: coin-shaped nonaqueous secondary battery
10': cylindrical nonaqueous secondary battery
11: negative electrode
12: negative electrode current collector
13: positive electrode
14: positive electrode current collector
15: nonaqueous electrolyte
16: separator
17: positive electrode terminal

18: negative electrode terminal
19: negative electrode plate
20: negative electrode lead
21: positive electrode
22: positive electrode lead
23: case
24: insulating plate
25: gasket
26: safety valve
27: PTC element

The invention claimed is:

1. A nonaqueous secondary battery comprising a negative electrode capable of intercalating and deintercalating lithium, a positive electrode containing a transition metal and lithium, and a nonaqueous electrolyte having a lithium salt dissolved in an organic solvent,
the nonaqueous electrolyte containing a polycarboxylic ester compound represented by general formula (1) or (2):

(1)

wherein $R^1$ is selected from the group consisting of vinylene, propenylene, isopropenylene, butenylene, pentenylene, hexenylene and 1-propenylen-2,3-diyl, or R1 is an arylene group having 6 to 12 carbon atoms; and $R^2$, $R^3$, $R^4$, $R^5$, $R^6$, and $R^7$ each independently represent an alkyl group having 1 to 6 carbon atoms or an alkenyl group having 2 to 6 carbon atoms;

(2)

wherein $R^8$ represents one of the following:

2. The nonaqueous secondary battery according to claim 1, wherein the positive electrode comprises an active material containing manganese.

3. The nonaqueous electrolyte for nonaqueous secondary batteries according to claim 1.

4. The nonaqueous electrolyte for nonaqueous secondary batteries according to claim 2.

* * * * *